United States Patent Office 3,507,332
Patented Apr. 21, 1970

3,507,332
HIGH TEMPERATURE CEMENTS
Charles R. Venable, Jr., and Francis J. Shell, Bartlesville, Okla., assignors to Phillips Petroleum Company, a corporation of Delaware
No Drawing. Filed Nov. 29, 1965, Ser. No. 510,403
Int. Cl. E21b *33/13*
U.S. Cl. 166—292                           10 Claims

ABSTRACT OF THE DISCLOSURE

High temperature resistant cement compositions consisting essentially of a high purity calcium aluminate cement component and from 40 to 200 weight percent, based on said cement component, of a finely divided high purity aggregate, e.g., fused alumina.

---

This invention relates to high temperature cement compositions and methods of using said compositions. In one aspect this invention relates to well cementing compositions capable of forming a cement which retains its strength and other desirable characteristics when subjected to temperatures up to at least 2500° F., or higher, over prolonged periods of time.

In recent years the interest and activity in the recovery of oil from underground formations, or tar sand deposits, by the so-called "fire flooding" or underground combustion processes has greatly increased. Such processes can be employed both in the primary and secondary recovery of oil. The use of such processes wherein temperatures as high as 2500° F. and higher are reached in the critical fire zone has focused attention on cementing compositions which can be used in cementing such wells.

Cements ordinarily used in cementing wells are not satisfactory for the cementing of combustion wells. For example, portland cement, while initially showing adequate strength, becomes brittle and shrinks about 6 percent in all dimensions when subjected to temperatures no higher than 1500 to 2000° F. Prior to our invention attempts have been made to formulate special cements for use in high temperature wells. However, said special cements will not withstand temperatures above about 1500 to 2000° F. This is not sufficient. A good high temperature well cement should be capable of withstanding a temperature up to at least 2500° F., or higher. The set cement should also have low permeability, sufficient compressive strength, and a low percent of linear change (expansion or contraction) throughout the range of temperatures to which it is exposed when placed in the well. Additionally, the cement aqueous slurry should remain fluid for a period of time sufficient to place same in the well at the zone which is to be cemented. This latter property is referred to as pumpability or thickening time.

The present invention solves the above problems by providing a cement composition and cement composition aqueous slurry which meet all the above requirements, and others, for high temperature well cements and are thus particularly adapted for cementing high temperature wells.

An object of this invention is to provide improved cement compositions and improved cement composition aqueous slurries which produce a cement capable of withstanding temperatures up to at least 2500° F., or higher. Another object of this invention is to provide high temperature cement compositions and cement composition aqueous slurries, capable of withstanding temperatures of at least 2500° F., and processes for employing said slurries for cementing casing in wells, for squeeze cementing in wells, and for grouting cracks, fractures, or voids in natural formatitons, such as in wells, or in manmade formations such as furnace walls, foundations and other structures of all types. Another object of this invention is to provide improved cement compositions and improved cement composition aqueous slurries which are particularly adapted for cementing high temperature combustion wells. Still another object of this invention is to provide a cement composition which is stable at temperatures up to at least 2500° F. and which is capable of being cast into well liners of low permeability to serve as a means for sand control in wells, particularly in high temperature combustion wells. Other aspects, objects, and advantages of the invention will be apparent to those skilled in the art in view of this disclosure.

Thus, according to the invention, there is provided a cement composition consisting essentially of a high purity calcium aluminate cement component mixed with, in weight percentages of the wegiht of said cement component, from 40 to 200 percent of a finely divided high purity aggregate selected from the group consisting of fused alumina, fused magnesium oxide, spinel, fused calcium oxide, fused dolomite and mixtures thereof.

In preparing the cement compositions of the invention, a high purity calcium-aluminate cement component is mixed with one or more of the components listed in Table I below. The amounts given in said Table I are all weight percentages of the weight of the dry cement and are thus equivalent to parts by weight per 100 parts by weight of the dry cement component. Said amounts are operable and useful in practicing the invention when used in the percentage amounts given in the column "Operable Amounts" and normally give the best results when used in the percentage amounts given in the column "Preferred Amounts."

TABLE I

| Material | Operable amounts, wt. percent | Preferred amounts wt. percent |
|---|---|---|
| Aggregate | 40 to 200 | 67 to 165. |
| Set retarder | 0.1 to 10 | 0.3 to 3. |
| Water | 35 to 90 | 54 to 70. |
| Alkali metal chloride | Up to sufficient to saturate the water.[1] | Sufficient to saturate the water.[2] |

[1] Approximately 8 to 23 wt. percent of the cement based on using he above amounts of water and saturated aqueous NaCl solution containing approximately 26 wt. percent NaCl, depending upon temperature and pressure.
[2] Approximately 14 to 18 wt. percent of the cement based on using the above amounts of water and saturated aqueous NaCl solution containing approximately 26 wt. percent NaCl, depending upon temperature and pressure.

The high purity calcium-aluminate cements used as the cement component in the practice of the invention are hydraulic cements. The differ from ordinary hydraulic cements, e.g., portland cement, by containing much higher concentrations of alumina and the active ingredients are compounds of calcium oxide and alumina. Such cements should contain at least about 69, preferably at least about 74 weight percent $Al_2O_3$, and at least 16, preferably at least about 16.5 weight percent calcium oxide. An example of one presently preferred high purity calcium-aluminate cement is known commercially as CA–25 cement. A typical analysis of this cement shows that it contains about 79 weight percent $Al_2O_3$ and about 18 weight percent CaO. Calcium-aluminate cements which are useful in the practice of this invention include those having an analysis within the ranges given in Table II below.

The presently preferred aggregates for use in the practice of the invention are the high purity fused aluminas containing at least 93, preferably at least about 98.5, weight percent $Al_2O_3$. An example of one presently preferred aggregate is known commercially as T–60 Tabular Alumina. A typical analysis of said T–60 Tabular Alumina shows that it contains 99+ weight percent $Al_2O_3$. High purity fused alumina aggregates which are useful in the practice of the invention include those having an analysis within the ranges given in Table II below.

TABLE II

| Constituent | Broad range, wt. percent | Preferred range wt. percent |
|---|---|---|
| Composition of high purity calcium-aluminate cements: | | |
| $Al_2O_3$ | 69-84 | 74-82 |
| CaO | 16-31 | 16.5-24.5 |
| $Fe_2O_3$ | 0-1.3 | 0-0.5 |
| $SiO_2$ | 0-2.0 | 0.5-1.6 |
| MgO | 0-1.1 | 0.1-0.8 |
| Loss on ignition | 0-1.9 | 0-1.6 |
| Composition of high purity alumina aggregate: | | |
| $Al_2O_3$ | 93-100 | 98.5-99.7 |
| $SiO_2$ | 0.04-7.0 | 0.04-1.5 |
| $Fe_2O_3$ | 0.04-0.5 | 0.05-0.4 |
| CaO | 0.04-0.2 | 0.06-0.1 |
| $Na_2O+K_2O$ | 0.02-0.7 | 0.10-0.5 |

Other aggregates which can be used in the practice of the invention are fused or dead-burned magnesium oxide, $MgO \cdot Al_2O_3$ (spinel), fused or dead-burned calcium oxide, and fused or dead-burned high purity dolomites. Aggregates such as mullite, kyanite, and calcined fire clays, ordinarily considered useful in high temperature cement compositions, are not useful in the cement compositions of this invention. The terms "fused" or "dead-burned" as used herein and in the claims, unless otherwise specified, are used generically to describe a material which has been heated to a sufficient temperature for a sufficient period of time that its hydration tendencies with hot water are essentially completely eliminated. All of the above-named aggregates should be high purity materials containing not less than about 93 weight percent of the named component.

We have also discovered that in the formulation of high temperature cement compositions careful consideration should be given to the particle size distribution of the combined cement component and the other components, and particularly the aggregate component if one is to obtain set cements having desired minimum permeability and desired minimum linear change. At least about 87 weight percent of the cement component will preferably have a particle size not greater than −250 mesh. The maximum particle size of the aggregate component should not be greater than about −20 mesh. We have discovered that good results are obtained when 100 percent of the aggregate has a particle size not greater than −48 mesh. However, more preferred results are obtained when from 40 to 84 weight percent of the aggregate has a particle size within the range of −28 to +48 mesh, from 8 to 30 weight percent has a particle size not greater than −48 mesh, and from 8 to 30 weight percent has a particle size not greater than −100 mesh.

As used herein and in the claims, unless otherwise specified, the mesh referred to in connection with the particle sizes of the aggregate and other components of the cement compositions refers to the mesh of Tyler standard screen-scale sieves. However, comparable particle sizes as determined by other screen series are within the scope of the invention.

In cementing wells, the cement composition aqueous slurry is pumped into the well, down the hole, and into contact with the formation or other place where it is desired to have it set or harden. Many variations of this basic method are known to the art. Most, if not all, of these methods can be employed in placing the cement composition slurries of the invention. Said cement composition aqueous slurries can also be placed in wells by the well-known dump bailer technique. When said slurry is to be pumped it must remain in a fluid or pumpable condition for a long enough period of time sufficient for the slurry to be pumped to the zone where the cement is to be placed. It is thus desirable to control the thickening time of the cement slurry when necessary. In the prior art of cementing wells it has beeen customary to employ set retarders or thickening time extending agents for this purpose. It is usually not necessary to employ such an agent in relatively shallow wells, e.g., up to a depth of 3000 to 4000 feet. In deeper wells where the heat and pressure tend to accelerate the setting of the cement, such agents are frequently employed.

Thus, in the practice of this invention, a set retarder or thickening time extending agent can be used if desired or necessary. Any suitable set retarder or thickening time extending agent can be employed and this invention is not limited to the usee of any particular such agent. In many instances, an agent of this type is not necessary. However, when such an agent is necessary, a presently preferred group of set retarders or thickening time extending agents are the acid carboxyalkyl hydroxyethyl cellulose mixed ethers and salts thereof. These materials also have water loss control properties and are commonly referred to as CMHEC. Further details regarding the manufacture and properties of CMHEC can be found in U.S. Patent 2,985,239, issued May 23, 1961, to Francis J. Shell. Other set retarders which can be used include boric acid, alkali metal phosphates, calcium lignin sulfonate, and others.

When a set retarder or thickening time extending agent is used in the practice of the invention, it is preferably used in a small but effective amount which is sufficient to extend the thickening time of the cement slurry to at least about 90 minutes. However, this does not mean that the cement composition aqueous slurries of the invention must have a thickening time of at least 90 minutes. In many instances, shorter thickening times in the order of 30 minutes, or less, are sufficient, for example, in the grouting or other work on furnace walls, or in other locations which are more accessible than in a well. Also, thickening times of less than 90 minutes will suffice in some instances where a well is to be cemented employing either pumping or dump bailer techniques.

The amount of water used in making the cement composition aqueous slurries of the invention can vary widely so long as a workable slurry which can be placed is obtained. In many instances, e.g., well cementing, it is preferred to add sufficient water to make the slurry fluid and pumpable. However, for many uses the slurry can be workable, i.e., placed where desired, without being pumpable. Amounts of water in the range of 35 to 90 weight percent of the dry cement component can be used. Preferably, the amount of water will be within the range of 54 to 70 weight percent. The amount of water used will vary with the amount and type of aggregate used. Said amount of water is not critical so long as the amount used does not exceed the amount sufficient to give a pumpable slurry which is stable, i.e., settling of solids and/or separation of water does not occur in the time required for the slurry to set. The actual amount of water to use in any specific composition can be determined by simple tests.

Any of the alkali metal chlorides can be used in the cement compositions and cement composition aqueous slurries of the invention. As used herein and in the claims, unless otherwise designated, the term "alkali metal" includes sodium, potassium, lithium, rubidium, and cesium. The sodium and potassium chlorides are preferred, with sodium chloride being the most preferred because of availability and price. The use of said alkali metal chlorides has several advantages. We have found that said chlorides decrease the amount of linear change, particularly shrinkage, of the set cement. We have also found that said alkali metal chlorides extend the thickening time of the cement composition aqueous slurries and, quite unexpectedly, stabilize said slurries. Still another advantage is that said alkali metal chlorides stabilize formations penetrated by the bore hole.

The amount of said alkali metal chloride which can be used in the practice of the invention is a small but effective amount up to the amount sufficient to saturate the water phase when water is added to the dry cement composition in an amount sufficient to produce a pumpable slurry.

The requirements for cement placed in high temperature or combustion wells are much more severe than for cements placed in ordinary wells. Cements in high temperature wells must retain their desirable properties even after exposure to high temperature for prolonged periods of time. For example, a good high temperature cement when set should meet or exceed the following requirements over a range of about 68 to at least about 2500° F.

| Property | Broad range | Perferred range |
|---|---|---|
| Permanent linear change: | | |
| Expansion, max | 1.0 | 0.8 |
| Shrinkage, max | 1.6 | 0.9 |
| Compressive strength, p.s.i., min | 200 | 600 |
| Permeability, millidarcys, max | 100 | 50 |
| Bulk density, lbs./ft.³ | 100–170 | 100–160 |

The following examples will serve to further illustrate the invention.

EXAMPLE I

A series of cement composition aqueous slurries was prepared for comparison purposes. These compositions were prepared by dry mixing the dry components and then mixing the dry mixture with the desired amount of water. The densities of the resulting aqueous slurries were determined. Samples of each slurry were then poured into individual wooden molds, allowed to set, and then cured at either 150 or 230° F. for 15 to 18 hours. The cured samples were then removed from the mold and fired in a kiln, raising the temperature about 100° F. per hour, and then holding the temperature at the desired maximum temperature for a period of about five hours.

Typical tests on the raw materials used in making said cement composition aqueous slurries are given in Table III below. The compositions of the cement aqueous slurries and the results of tests thereon and the cured cements are set forth in Table IV below.

TABLE III.—PROPERTIES OF BATCH INGREDIENTS (RAW MATERIALS)

| Raw material | CA-25 cement | Lumnite cement | T-60 tabular alumina | Mullite W | Raw kyanite | Calcined high-duty fire clay |
|---|---|---|---|---|---|---|
| Chemical analysis: | | | | | | |
| $Al_2O_3$ | 79.0 | ¹41.8 | 99.0+ | 77.7 | 60.5± | 41.0 |
| $SiO_2$ | 0.1 | 8.3 | 0.1 | 22.0 | 38.7 | 53.5 |
| $Fe_2O_3$ | 0.3 | 4.7 | 0.4 | 0.12 | 0.55± | 1.6 |
| $FeO$ | | 5.4 | | | | |
| $CaO$ | 18.0 | 36.6 | 0.07 | | 0.03 | 0.3 |
| $TiO_2$ | | (²) | | 0.05 | 0.67 | 2.0 |
| $MgO$ | 0.4 | 1.1 | | | 0.01 | 0.4 |
| $Na_2O+K_2O$ | 0.5 | 0.2 | 0.13 | 0.35 | 0.42 | 1.2 |
| Ignition loss | 1.5 | 1.1 | | | 0.21 | |
| Sieve Specification | None | None | −28 to +48 mesh | −48 mesh | −100 mesh | −28 to +48 mesh | −48 mesh | −100 mesh | −48 mesh | None |
| Sieve analysis (percent wt.):³ | | | | | | | | | | |
| +14 mesh | | | | | | | | | | Trace |
| +28 mesh | | | | | | Trace | | | | 2.0 |
| +48 mesh | | 0.2 | 88.7 | Trace | | 97.7 | 45.8 | | 8.8 | 46.9 |
| +100 mesh | 1.5 | 0.9 | 11.1 | 18.9 | 1.6 | 2.1 | 37.7 | 3.8 | 29.6 | 26.8 |
| +150 mesh | | 2.8 | Trace | 12.3 | 16.6 | 0.1 | 8.2 | 17.5 | 13.0 | 7.9 |
| +200 mesh | 1.9 | 7.6 | Trace | 8.7 | 13.8 | Trace | 4.5 | 20.8 | 9.3 | 3.7 |
| +325 mesh | 3.3 | 71.4 | 0.2 | 39.8 | 44.9 | Trace | 3.1 | 48.0 | 11.7 | 7.2 |
| −325 mesh | 93.3 | 17.1 | | 20.3 | 23.1 | Trace | 0.7 | 9.9 | 27.6 | 5.5 |

¹ Includes $TiO_2$.
² See $Al_2O_3$ figure above.
³ Tyler screens.

TABLE IV.—COMPOSITION AND PHYSICAL PROPERTIES, HIGH TEMPERATURE CEMENTS

| Run No | 1 | 2 | 3 | 4 | 5 | 6 |
|---|---|---|---|---|---|---|
| Dry composition, parts by weight: | | | | | | |
| CA-25 cement | 100 | 100 | 100 | 100 | 100 | 100 |
| T-60 tabular alumina: | | | | | | |
| −28 to +48 mesh | | | | | 100 | 75 |
| −48 mesh to fines | | 100 | 400 | 100 | 25 | 25 |
| −100 mesh to fines | | | | 50 | 25 | 25 |
| Raw kyanite: −48 mesh | | | | | | 25 |
| Water content, percent by weight | 26.2 | 35.0 | 84.5 | 46.0 | 36.7 | 32.6 |
| Weight of slurry, lb./gal | | 21.1 | | 21.35 | 22.4 | 21.95 |
| Bulk density, lb./ft.³: | | | | | | |
| Dried at 150 F | | | | 151 | | |
| Dried at 230 F | 129 | 151 | 150 | | 157 | 151 |
| Heated to 1,500 F | 111 | 138 | 145 | 139 | 145 | 142 |
| Heated to 2,500 F | 126 | 141 | 150 | 139 | 152 | 151 |
| Heated to 3,000 F | | 138 | | 134 | 143 | |
| Permanent linear change, percent: ¹ | | | | | | |
| Dried at 150 F | | | | −0.38 | | |
| Dried at 230 F | −0.08 | −0.07 | −0.05 | | −0.12 | −0.12 |
| Heated to 1,500 F | −0.49 | −0.22 | −0.33 | 0–.88 | −0.25 | −0.28 |
| Heated to 2,500 F | −3.96 | −1.54 | −1.75 | −0.05 | −1.50 | −2.68 |
| Heated to 3,000 F | | +0.33 | | 0.00 | −0.12 | |
| Air permeability, millidarcys: ² | | | | | | |
| Heated to 1,500 F | N.D. | 0.28–1.36 | 9.7–10.3 | 1.9–3.2 | 0.30–0.39 | 1.4–1.5 |
| Heated to 2,500 F | | 5.4–7.1 | 66–68 | 24–35 | 2.7–5.4 | 105–111 |
| Heated to 3,000 F | | 111–138 | | 140–149 | 98–100 | |
| Compressive strength, p.s.i.: | | | | | | |
| Heated to 1,500 F | | 7,530 | 2,440 | | ³7,390–7,880 | |
| Heated to 2,500 F | 9,030 | 10,120 | 9,380 | N.D. | 12,340 | N.D. |
| Heated to 3,000 F | | | | | 8,330 | |

¹ − Denotes shrinkage, + denotes expansion.
² Figures given are high and low values of 3 specimens tested.
³ 230 F.
N.D.=not determined.

Referring to the above Table IV, Run No. 1 represents a control run on a presently preferred cement component without using any other components therewith, except water. The data show that a cement composition consisting essentially of CA-25 cement and water is not satisfactory as a high temperature well cement because the set cement has too high a shrinkage at 2500° F. Comparing Run 2, a cement composition in accordance with the invention, with Run 1 shows that the inclusion of 100 percent by weight of the dry cement component of a high purity fused alumina aggregate materially improves the set cement in every respect. The set cement passed all tests at 2500° F. Run 3 shows that the inclusion of too much aggregate renders the cement unacceptable because of too much shrinkage.

A comparison of Runs 4 and 5 illustrates the desirability of "gap sizing" or the proper choice of aggregate particle size. The cement of Run 5 is a much superior cement because of its much improved permeability throughout the entire range. While the cement of Run 4 is a good cement and meets all requirements at 2500° F., it fails at 3000° F. The cement of Run 5 was good even at 3000° F.

A comparison of the cement of Run 6 with the cement of Run 5 shows that inclusion of kyanite as the aggregate causes the cement to fail with respect to both permanent linear change and permeability.

EXAMPLE II

Another cement composition aqueous slurry like that of Run 5 in Example I was prepared except that the amount of water used was 68.5 weight percent. The slurry density was 19.7 pounds per gallon. The thickening time of the slurry was 40 minutes. The slurry was poured in wooden molds lined with polyethylene film and cured at 135° F. for 72 hours. Results of tests on the cured cement after heating to 2500° F. essentially as in Example I were as follows:

Permanent linear change, percent _____ −2.35
Air permeability, md. _____ 80–94
Compressive strength, p.s.i. _____ 2090

EXAMPLE III

The cement composition aqueous slurry of Run 5 was modified by increasing the water content to 68.2 weight percent of the dry cement component and including therein sufficient sodium chloride to saturate the water. After preparing the slurry as in Example I, two procedures were employed in preparing the set and cured cement for evaluation. In procedure 1, intended to stimulate placing the cement in contact with an impermeable shale, individual samples of the slurry were poured into wooden molds which had been lined with polyethylene film. The samples were then cured in an oven at 140° F. for 72 hours, while covered with polyethylene film. In procedure 2, intended to stimulate placing the cement in contact with a permeable sand, individual samples of the slurry were filter pressed for 90 minutes at 100 p.s.i.g. in a standard API water loss test apparatus. The samples were then cured 24 hours at 140° F. under a pressure of 3000 p.s.i. The composition of the cement aqueous slurries and the results of tests on the cured cement samples are set forth in Table V below.

TABLE V.—COMPOSITION AND PHYSICAL PROPERTIES, HIGH TEMPERATURE CEMENT

| Run Number | 7 | |
|---|---|---|
| Dry composition, parts by wt.: | | |
| CA-25 cement | 100 | |
| T-60 tabular alumina: | | |
| −28 to +48 mesh | 100 | |
| −48 mesh | 25 | |
| −100 mesh | 25 | |
| NaCl | 24 | |
| Water content,[1] wt. percent | 68.2 | |
| Slurry density, lbs./gal | 19.8 | |
| Viscosity, Fann VG meter readings at 600 and 300 r.p.m. | 260 and 175 | |
| Thickening time, minutes | 96 | |

| | Procedure | |
|---|---|---|
| | I | II |
| Bulk density, lbs./ft.[3]: | | |
| Dried at 230° F | 129 | N.D. |
| Heated to 1,500° F | 117 | 150 |
| Heated to 2,500° F | 110 | 135 |
| Permanent linear change,[2] percent: | | |
| Dried at 230° F | 0 | N.D. |
| Heated to 1,500° F | −0.13 | +0.15 |
| Heated to 2,500° F | −0.88 | −0.90 |
| Air permeability, millidarcys: | | |
| Heated to 1,500° F | 5.5–6.1 | 0.35–0.42 |
| Heated to 2,500° F | 78–80 | 14–18 |
| Compressive strength, p.s.i.: | | |
| Heated to 1,500° F | 2,300 | 4,150 |
| Heated to 2,500° F | 2,230 | 3,970 |

[1] Based on the slurry.
[2] −Denotes shrinkage, + denotes expansion.

Referring to the above Table V and comparing Run 7 with Run 5, it will be noted that the cement of Run 7 is superior to Run 5 with respect to permanent linear change. Comparing the cement of Run 7 with the cement of Example II shows that the cement of Run 7 was superior with respect to permanent linear change and compressive strength. Furthermore, the slurry of Example II tended to be unstable, i.e., the solids tended to settle, whereas the slurry of Run 7 (Example III), which contained sodium chloride, was completely stable. It will also be noted the slurry of Run 7 had a thickening time of 96 minutes compared to 44 minutes for the slurry of Example II.

EXAMPLE IV

Another cement composition aqueous slurry was prepared having a composition similar to that of Run 2 except that calcined fire clay was substituted for the high purity alumina aggregate, and Lumnite, a low purity calcium aluminate cement, was substituted for the high purity calcium aluminate cement component. The cured cement samples prepared from this composition slumped and fused when heated to 2500° F.

EXAMPLE V

Another cement composition aqueous slurry was prepared similarly as in Run 7 in Example III above except that mullite was substituted for the tabular alumina aggregate. When the cured cement samples resulting from this slurry were tested, it was found they failed to meet the requirements of a high temperature well cement because they had excess permeability and excess shrinkage.

All tests on the cement samples in the above examples were run in accordance with standard cement testing procedures unless otherwise specified.

While the cement compositions and cement composition aqueous slurries of the invention have been described as being particularly adapted for use in high temperature wells, they can also be used in ordinary wells. Said cement composition aqueous slurries are also particularly adapted for casting cylindrical liners having a low permeability for use in wells, both high temperature and ordinary temperature, for sand control. The cement composition aqueous slurries of the invention can also be used in other structures.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:
1. A cement composition consisting essentially of a high purity calcium aluminate cement component mixed with, in weight percentages of the weight of said cement component, from 40 to 200 percent of a finely divided high purity fused alumina aggregate; said cement component having an analysis within the range of from 69 to 84 weight percent $Al_2O_3$ and from 16 to 31 weight percent CaO; and from 40 to 84 weight percent of said aggregate having a particle size within the range of from —28 to +48 mesh, from 8 to 30 weight percent of said aggregate having a particle size not greater than —48 mesh, and from 8 to 30 weight percent of said aggregate having a particle size not greater than —100 mesh.

2. A cement composition according to claim 1 wherein said aggregate is present in an amount within the range of from 67 to 135 weight percent of the weight of said cement component; and said cement component has an analysis within the range of from 74 to 82 weight percent $Al_2O_3$ and from 16.5 to 24.5 weight percent CaO.

3. A cement composition according to claim 1 wherein there is also mixed with said cement component an alkali metal chloride in an amount up to the amount sufficient to saturate the water phase when water is added to said cement composition in an amount sufficient to produce a workable slurry.

4. A cement composition according to claim 3 wherein said alkali metal chloride is sodium chloride.

5. A cement composition aqueous slurry consisting essentially of the cement composition of claim 1 mixed with sufficient water to produce a pumpable slurry.

6. A cement composition aqueous slurry consisting essentially of the cement composition of claim 4 mixed with sufficient water to produce a pumpable slurry.

7. A method of cementing a casing in a well, which method comprises pumping a cement composition aqueous slurry in accordance with claim 5 into the annular space between said casing and the wall of said well and into contact with said casing and an earth formation penetrated by said well.

8. As a new article of manufacture, a hollow cylindrical sleeve having a permeability through the walls thereof within the range of from 0 to about 100 milidarcys, and fabricated from the cement composition of claim 1.

9. As a new article of manufacture, a hollow cylindrical sleeve having a permeability through the walls thereof within the range of from 0 to about 100 millidarcys, and fabricated from the cement composition of claim 3 wherein said alkali metal chloride is sodium chloride.

10. A cement composition consisting essentially of a high purity calcium aluminate cement component mixed with, in weight percentages of the weight of said cement component, from 40 to 200 percent of a finely divided high purity fused alumina aggregate; said cement component having an anlysis within the range of from 69 to 84 weight percent $Al_2O_3$ and from 16 to 31 weight percent CaO; and the particle size of said aggregate being not greater than —48 mesh.

References Cited

UNITED STATES PATENTS

| | | | |
|---|---|---|---|
| 2,121,087 | 6/1938 | Labra | 106—104 XR |
| 2,391,493 | 12/1945 | Wainer et al. | 106—104 XR |
| 2,845,360 | 7/1958 | King et al. | 106—104 |
| 2,899,326 | 8/1959 | Butler | 106—104 XR |
| 2,911,311 | 11/1959 | Feagin et al. | 106—104 XR |
| 2,912,341 | 11/1959 | Ricker | 106—104 XR |
| 2,985,239 | 5/1961 | Shell | 106—76 XR |
| 3,010,835 | 11/1961 | Charles et al. | 106—104 XR |
| 3,071,481 | 1/1963 | Beach et al. | 106—90 |
| 3,180,748 | 4/1965 | Holmgren | 106—104 |
| 3,181,959 | 5/1965 | Raine et al. | 106—104 XR |
| 3,226,240 | 12/1965 | Crowley | 106—104 XR |
| 3,311,686 | 3/1967 | Christy | 106—104 XR |
| 3,313,638 | 4/1967 | Konrad. | |
| 2,845,360 | 7/1058 | King et al. | 106—104 |
| 2,965,506 | 12/1960 | Ueltz | 106—64 |
| 3,341,339 | 9/1967 | Stein | 106—64 |

OTHER REFERENCES

Lea et al.: The Chemistry of Cement and Concrete, Edward Arnald (publ.) Ltd., London (1956), pp. 445–46.

JAMES E. POER, Primary Examiner

H. M. S. SNEED, Assistant Examiner

U.S. Cl. X.R.

106—64, 104; 138—177